United States Patent
Kuethe

[15] 3,664,463
[45] May 23, 1972

[54] DEPLOYABLE SHOCK ABSORBER

[72] Inventor: Melvin W. Kuethe, Littleton, Colo.
[73] Assignee: Martin Marietta Corporation, New York, N.Y.
[22] Filed: Nov. 10, 1970
[21] Appl. No.: 88,323

[52] U.S. Cl. .................................188/1 C, 92/30, 92/85, 244/100 R
[51] Int. Cl. ...........................................F16f 7/12
[58] Field of Search ...............92/30, 85; 188/1 C; 244/100 R

[56] References Cited

UNITED STATES PATENTS

| | | | |
|---|---|---|---|
| 3,228,492 | 1/1966 | Blumrich | 188/1 C |
| 3,295,798 | 1/1967 | Hopping et al. | 188/1 C X |
| 3,420,475 | 1/1969 | Castillo et al. | 188/1 C X |

*Primary Examiner*—Duane A. Reger
*Attorney*—Phillip L. DeArment and Gay Chin

[57] ABSTRACT

A deployable shock absorber including a cylinder closed at one end and a piston having a latch assembly disposed at the opposite end; a tubular sleeve of crushable shock absorbing material is mounted in the cylinder, coaxially therewith, one end of the sleeve abutting the closed end of the cylinder, and the opposite end of the sleeve abutting the inner face of the piston. A piston rod is slidably mounted within the tubular sleeve, whereby in the retracted position the inner end of the piston rod abuts the closed end of the cylinder; when extended, the inner end of the piston rod becomes latched to the piston, and upon impact, the piston rod and associated piston are driven inwardly toward the closed end of the cylinder to thereby crush the sleeve, whereby the impact shock is absorbed.

11 Claims, 9 Drawing Figures

PATENTED MAY 23 1972 3,664,463

INVENTOR
MELVIN W. KUETHE

BY Brady, O'Boyle + Gates

ATTORNEYS

INVENTOR
MELVIN W. KUETHE

BY Brady, O'Boyle & Gates
ATTORNEYS

DEPLOYABLE SHOCK ABSORBER

BACKGROUND OF THE INVENTION

In the continuing research and development of space vehicles for landing on the surface of the moon, and other extra terrestrial planets, the vehicles are being designed to land on the planetary surface in such a manner that during the landing operation, the vehicle is braked to a full stop a short distance above the planetary surface and then allowed to freely drop to impact on the planet's surface. In order to absorb the shock of the impact, suitable landing gear has to be designed for the vehicle to afford a minimum of vehicle rebound after impact while at the same time being consistent with weight and size limitations imposed on the various components of the space vehicle.

After considerable research and experimentation, the shock absorber of the present invention has been devised which efficiently absorbs shock energy on impact of a flight vehicle on a planet's surface while at the same time being relatively simple in construction and operation consistent with design limitations imposed thereon; the shock absorber of the present invention comprising, essentially, a cylinder having a tubular sleeve of crushable shock absorbing material mounted therein. One end of the sleeve abuts the closed end of the cylinder while the opposite end of the sleeve abuts a piston disposed at the open end of the cylinder. The piston includes a latch assembly for connecting a piston rod thereto which is slidably mounted within the sleeve. By this construction and arrangement, when the shock absorber is in the inoperative, retracted position the inner end of the piston rod abuts the closed end of the cylinder; when extended, the inner end of the piston rod becomes latched to the piston, and upon impact, the piston rod and associated piston are driven inwardly toward the closed end of the cylinder to thereby crush the sleeve, whereby the impact shock is absorbed.

Figure 1:
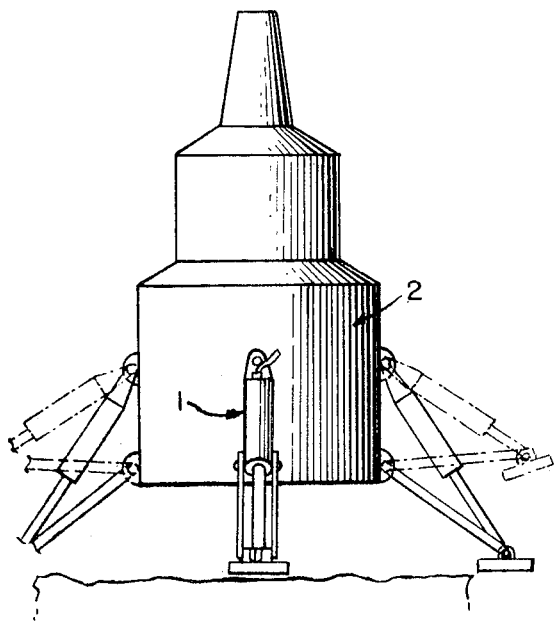
FIG. 1 is a side elevational view showing the shock absorber of the present invention mounted in operative position on a flight vehicle.

Referring to the drawings and more particularly to FIG. 1, the shock absorber 1 of the present invention is adapted to be mounted on a flight vehicle 2 thereby providing a landing gear system for the vehicle when a plurality of the shock absorbers are secured in equally spaced relationship around the flight vehicle near the lower end thereof. During the flight of the vehicle, the shock absorbers are maintained in a retracted position and before contact is made with the landing surface all of the shock absorbers are moved to their extended positions for making initial contact with the landing surface to bring the vehicle to a controlled stop.

Figure 2:
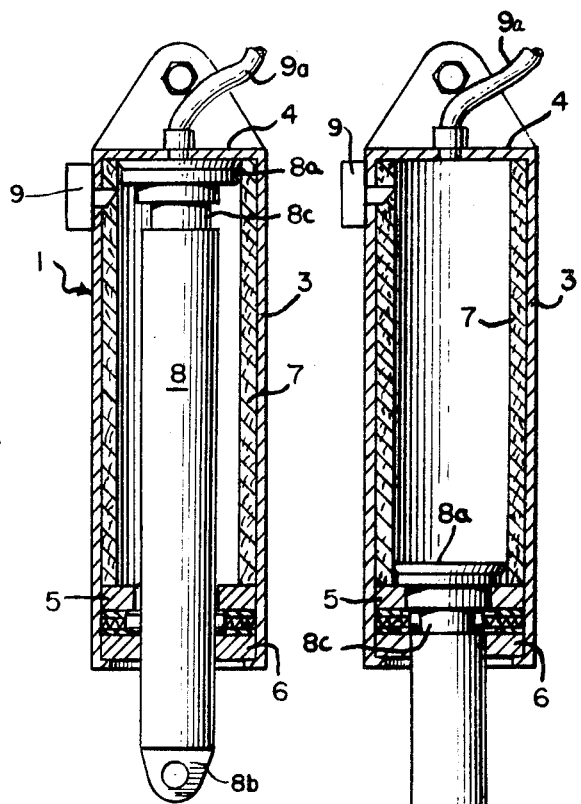
FIG. 2 is a side elevational view, partially in section, showing the shock absorber of the present invention in the retracted, or inoperative, position.

As will be seen in FIG. 2, each of the shock absorbers 1 forming the flight vehicle landing gear system comprises a cylinder 3 closed at one end by wall 4 and at the opposite end by a piston 5 supported on a seal 6. A tubular sleeve 7 of crushable shock absorbing material, such as metallic honeycomb, cellular polystyrene, or the like, is mounted within the cylinder, coaxially therewith, one end of the sleeve abutting the wall 4 of the cylinder and the opposite end of the sleeve abutting the inner face of the piston 5. A piston rod 8 is slidably mounted within the sleeve 7 and is provided with a head portion 8a which abuts the cylinder end wall 4 when the shock absorber is disposed in the retracted position, the outer end 8b of the piston rod being attached to a conventional landing pad adapted to engage the landing surface.

A retractable detent mechanism 9 is mounted on the cylinder wall in proximity to the end wall 4 and is adapted to engage the piston rod head portion 8a to hold the piston rod in the retracted position. Suitable controls are connected to the detent mechanism whereby it may be moved to the retracted position to release the piston rod.

Figure 3:
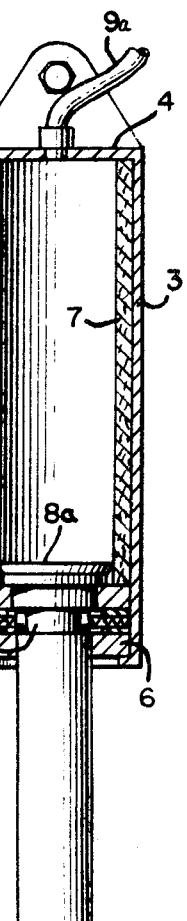
FIG. 3 is a side elevational view, partially in section, showing the shock absorber of the present invention in the extended, operative position prior to impact.

A pressurized fluid connection 9a is mounted on the cylinder end wall 4 and is in communication with the interior of the cylinder whereby when fluid is admitted to the cylinder the piston rod is moved outwardly of the cylinder from its retracted position shown in FIG. 2 to its extended position illustrated in FIG. 3. When moving to its extended position, the piston rod 8 slides relative to the piston 5 until it reaches its extended position whereupon the piston rod becomes latched to the piston.

Figure 5:
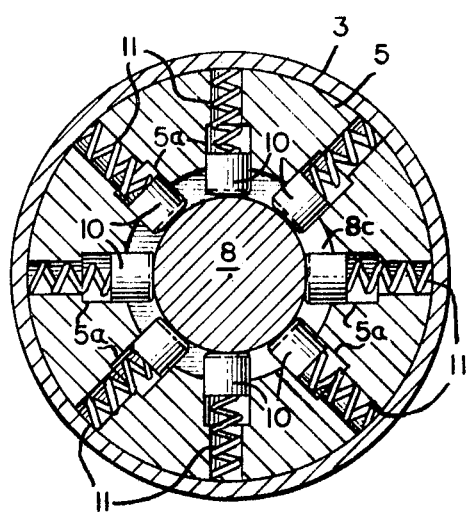
FIG. 5 is an enlarged view taken along line 5—5 of FIG. 4 showing the latch assembly for connecting the piston to the piston rod.

The latching mechanism for connecting the piston rod 8 to the piston 5 is clearly illustrated in FIGS. 2, 3, and 5 wherein it will be seen that a plurality of radially extending, spring biased pins or detents 10 are slidably mounted in radial bores 5a formed in the piston, each pin being biased radially inwardly by a compression spring 11 having one end abutting one face of the pin, the opposite end of the spring abutting the inner wall of the cylinder 3. The opposite face of each pin engages the surface of the piston rod 8 when the shock absorber is disposed in its retracted position as shown in FIG. 2; however, when the shock absorber is energized to its extended position, the pins 10 enter an annular recess or groove 8c formed in the piston rod adjacent the head portion 8a whereby the piston 5 becomes latched to the piston rod 8.

Figure 4:
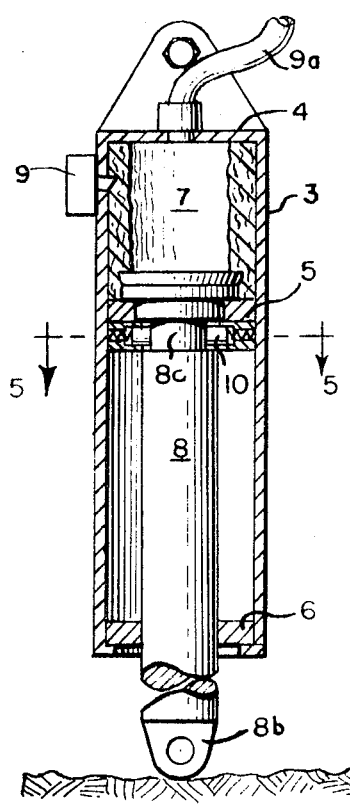
FIG. 4 is a side elevational view, partially in section, showing the position of the shock absorber of the present invention after impact.

In the operation of the deployable shock absorber of the present invention, during the flight of the vehicle, each of the shock absorbers 1 is maintained in a retracted position as shown in FIG. 2. Preparatory to landing on a planetary surface, the vehicle is braked to a full stop a short distance above the surface and the shock absorbers are energized to the extended position as shown in FIG. 3, whereupon each piston rod becomes latched to its respective piston as described hereinabove. After the shock absorbers have been extended, the flight vehicle is allowed to drop freely and the impact of the shock absorber landing pad against the landing surface causes the piston rod 8 and associated piston 5 to be driven inwardly of the cylinder against the sleeve 7 thereby crushing the shock absorbing sleeve as shown in FIG. 4, whereby the impact shock is absorbed.

Figure 6:
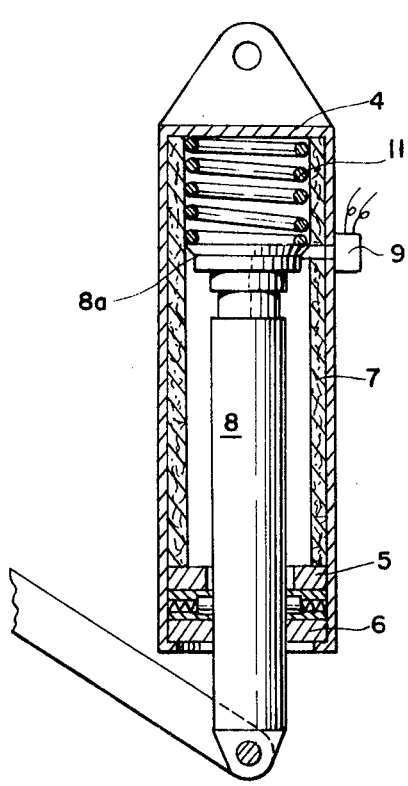
FIG. 6 is a side elevational view, partially in section, showing the shock absorber of the present invention in the latched retracted position and being urged to the extended position by a coil spring.

While pressurized fluid is employed to actuate the piston rod to the extended position as shown in FIG. 3, a coil spring 11 can be used in lieu thereof as shown in FIG. 6, the spring being mounted between the cylinder end wall 4 and piston rod head portion 8a and biasing the piston rod to the extended position.

Figure 7:
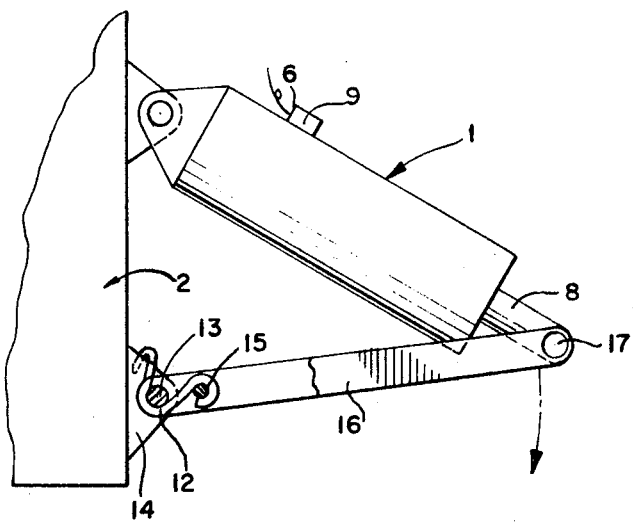
FIG. 7 is a side elevational view of the shock absorber of the present invention in the latched, retracted position and being urged to the extended position by a torsion spring.

FIG. 7 illustrates yet another mechanism for urging the piston rod to the extended position wherein a torsion spring 12 is wound around a pivot pin 13 carried by a lug 14 secured to the space craft 2. One end of the torsion spring is connected to the lug 14 and the opposite end of the spring is connected to a pin 15 secured to a link 16 having one end pivotally connected to the pin 13 and the opposite end pivotally connected as at 17 to the end of the piston rod. By this construction and arrangement, when the detent mechanism is released, the torsion spring 12 will cause link 16 to pivot in the direction of the arrow shown in FIG. 7 thereby pulling the piston rod 8 to the extended position.

While various biasing mechanisms, such as pressurized fluid, coil springs and torsion springs, have been disclosed for urging the piston rod to the extended position, in some instances these mechanisms will not be required and the piston rod will move to the extended position through the force of gravity once released by the detent mechanism.

The tubular sleeve 7 shown in the shock absorbers of FIGS. 2, 3 and 4 is formed as a homogenous member constructed from crushable shock absorbing material such as metallic honeycomb, cellular polystyrene, and the like. Such a homogeneous structure will provide a constant load-stroke curve. It is also within the purview of the present invention to construct the cylinder in such a manner so as to provide a variable load-stroke curve by forming the tubular sleeve out of different materials, each having a different crush strength.

Figure 8:
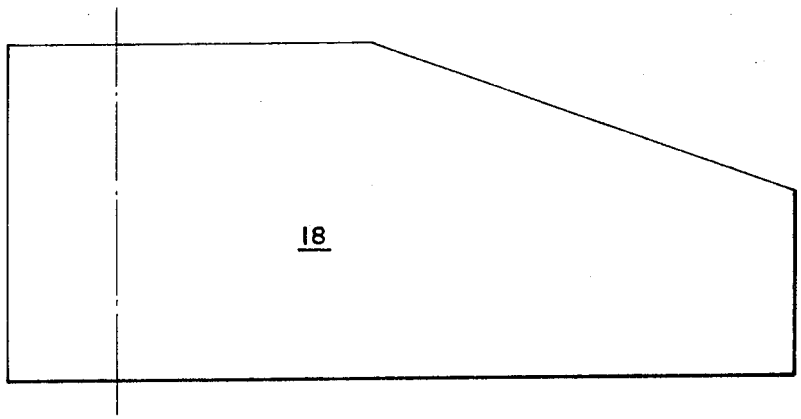
FIG. 8 is a side elevational view of a sheet of crushable material for use in the shock absorber of the present invention.
Figure 9:
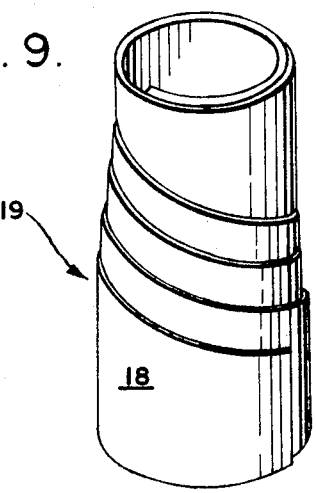
FIG. 9 is a perspective view of the sheet of crushable material illustrated in FIG. 8, rolled to form a spiral configuration prior to insertion into the shock absorber of the present invention.

FIGS. 8 and 9 illustrate another manner of forming a tubular sleeve to provide a variable stroke curve wherein a precut corrugated sheet 18 (FIG. 8) is wound into the form of a cylindrical spiral 19, as shown in FIG. 9, whereby the convolutions of the wound sheet form a cylinder having a wall of varying thickness. When mounted in the shock absorber cylinder, the thicker end of the cylindrical spiral 19 is seated on the piston 5 whereby the greatest resistance is afforded by the sleeve upon initial impact, the resistance decreasing gradually as the piston moves toward the closed end of the cylinder.

From the above description, it will be readily apparent to those skilled in the art that the deployable shock absorber of the present invention provides a device for efficiently absorbing shock energy on impact of a flight vehicle on a planet's surface, while at the same time being relatively simple in construction and operation consistent with design limitations imposed on the various components of the space vehicle.

I claim:

1. A deployable shock absorber of the character described comprising a cylinder, a piston rod slidably mounted within said cylinder, a piston disposed within said cylinder, said piston rod being detached from said piston when in the inoperative retracted position, latch means for connecting said piston rod to said piston when said piston rod is disposed in the extended position, and a shock absorbing medium disposed in said cylinder.

2. A deployable shock absorber according to claim 1 wherein means are operatively connected to the cylinder and piston rod for moving the piston rod to the extended position.

3. A deployable shock absorber according to claim 1 wherein an end wall is formed on one end of said cylinder, and a head portion formed on the inner end of said piston engaging said cylinder end wall when said piston rod is disposed in the retracted position, the piston being positioned at the opposite end of the cylinder.

4. A deployable shock absorber according to claim 1 wherein the latch means comprises a plurality of radially extending spring biased detents mounted within said piston, and an annular groove formed on said piston rod adjacent the inner end thereof, said detents being adapted to engage the annular groove whereby the piston rod becomes latched to the piston.

5. A deployable shock absorber according to claim 3 wherein the shock absorbing medium comprises a tubular sleeve of crushable shock absorbing material mounted in the cylinder coaxially therewith, one end of the sleeve abutting the end wall of the cylinder, the opposite end of the sleeve abutting the piston.

6. A deployable shock absorber according to claim 1, wherein a detent mechanism is mounted on the cylinder for holding the piston rod in the inoperative, retracted position.

7. A deployable shock absorber according to claim 2, wherein the means for moving the piston rod to the extended position comprises a conduit connected to the cylinder and adapted to supply pressurized fluid thereto.

8. A deployable shock absorber according to claim 2 wherein the means for moving the piston rod to the extended position comprises a coil spring mounted between an end wall of the cylinder and the piston rod.

9. A deployable shock absorber according to claim 2, wherein the means for moving the piston rod to the extended position comprises a torsion spring, said torsion spring being mounted on a supporting surface, one end of the spring being secured to the surface and the opposite end of the spring being connected to the piston rod.

10. A deployable shock absorber according to claim 5, wherein the tubular sleeve is formed from a plurality of crushable shock absorbing materials, each having a different crush strength, to thereby provide a variable load-stroke curve.

11. A deployable shock absorber according to claim 5, wherein the tubular sleeve is formed from a corrugated sheet wound into a cylindrical spiral.

* * * * *